United States Patent [19]

Petre

[11] Patent Number: 4,901,967

[45] Date of Patent: Feb. 20, 1990

[54] PATIENT EQUIPMENT TRANSPORT AND SUPPORT SYSTEM

[75] Inventor: John H. Petre, Cleveland Heights, Ohio

[73] Assignee: The Cleveland Clinic Foundation, Cleveland, Ohio

[21] Appl. No.: 251,191

[22] Filed: Sep. 29, 1988

Related U.S. Application Data

[62] Division of Ser. No. 886,207, Jul. 15, 1986, Pat. No. 4,795,122.

[51] Int. Cl.⁴ .............................................. A61B 19/00
[52] U.S. Cl. ..................................................... 248/327
[58] Field of Search ............... 248/631, 651, 669, 124, 248/125, 161, 317, 320, 327, 333; 312/247; 378/193, 198, 197

[56] References Cited

U.S. PATENT DOCUMENTS

| | | | |
|---|---|---|---|
| 3,373,285 | 3/1968 | Barrett | 248/333 |
| 3,556,455 | 1/1971 | Storm | 248/333 |
| 3,599,922 | 8/1971 | Junginger | 248/333 |
| 3,776,500 | 12/1973 | Fodenaro | 248/333 |
| 3,790,119 | 2/1974 | Bauer | 248/161 |
| 4,435,830 | 3/1984 | Suzuki | 378/197 |
| 4,673,154 | 6/1987 | Karapita | 248/320 |
| 4,711,184 | 12/1987 | Wallin | 248/161 |

FOREIGN PATENT DOCUMENTS 3218301 11/1983 Fed. Rep. of Germany ...... 378/198

Primary Examiner—Ramon O. Ramirez
Assistant Examiner—Robert A. Olson
Attorney, Agent, or Firm—Fay, Sharpe, Beall, Fagan, Minnich & McKee

[57] ABSTRACT

A selectively transportable equipment support system is provided for operative association with an invalid transport vehicle such as a hospital bed. The system includes a transport bracket for selective secured association with a hospital bed or a service column. Various patient care items are secured to the transport bracket. Such items preferably comprise infusion pumps with associated fluid bags that are typically transported with the patients and employed in surgical rooms or intensive care units. The transport bracket includes a pivot post for reception in a service column latching assembly which allows pivotable movement of the transport bracket when it is secured to a service column support arm. The service columns are pneumatically powered for powered lifting and positioning of the transport bracket.

1 Claim, 9 Drawing Sheets

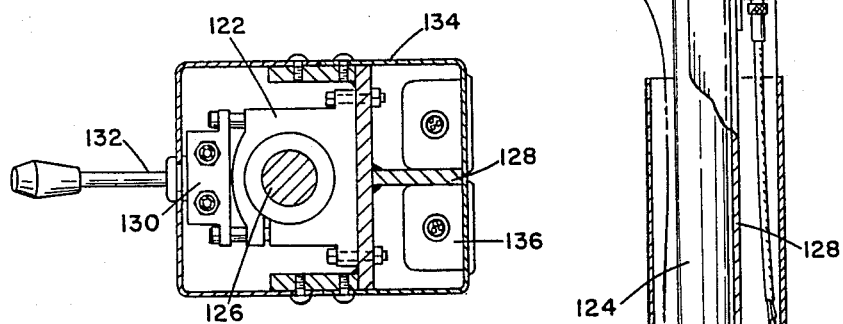
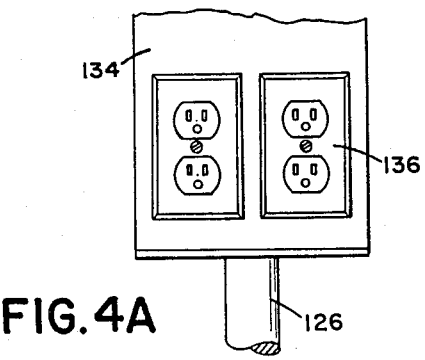
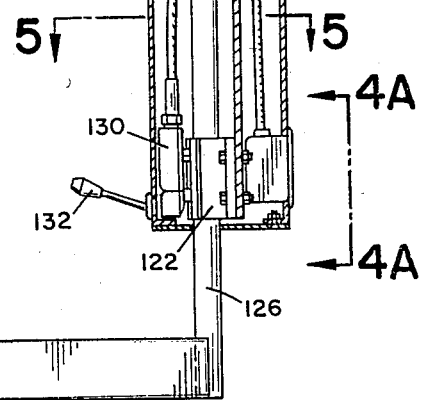
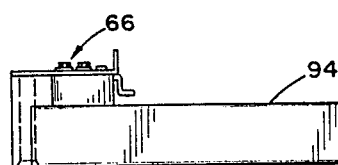
FIG. 5
FIG. 4A
FIG. 4

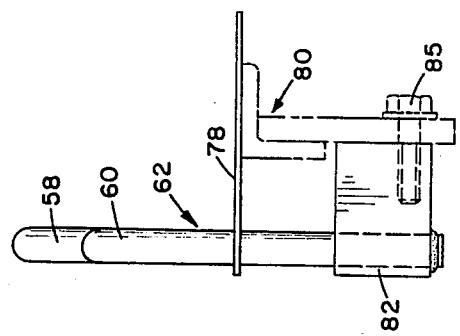
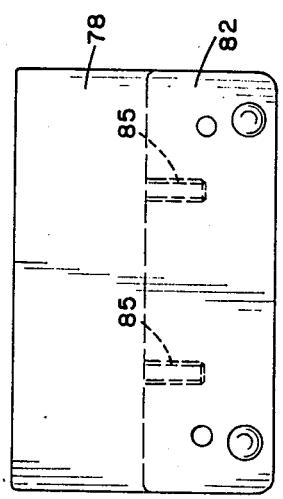
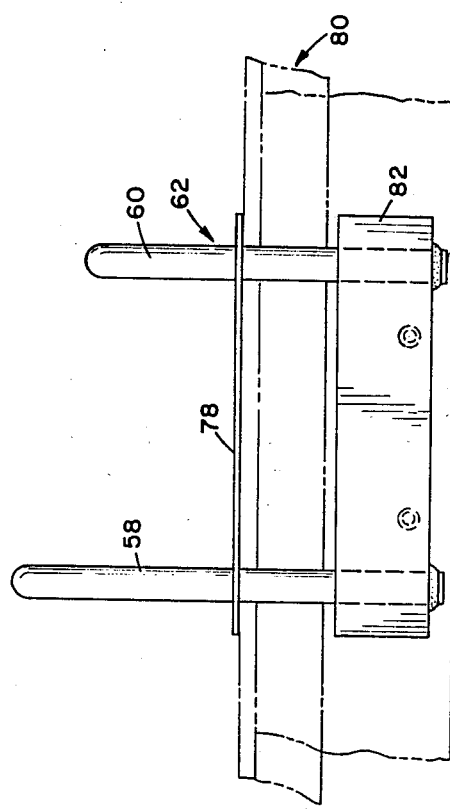

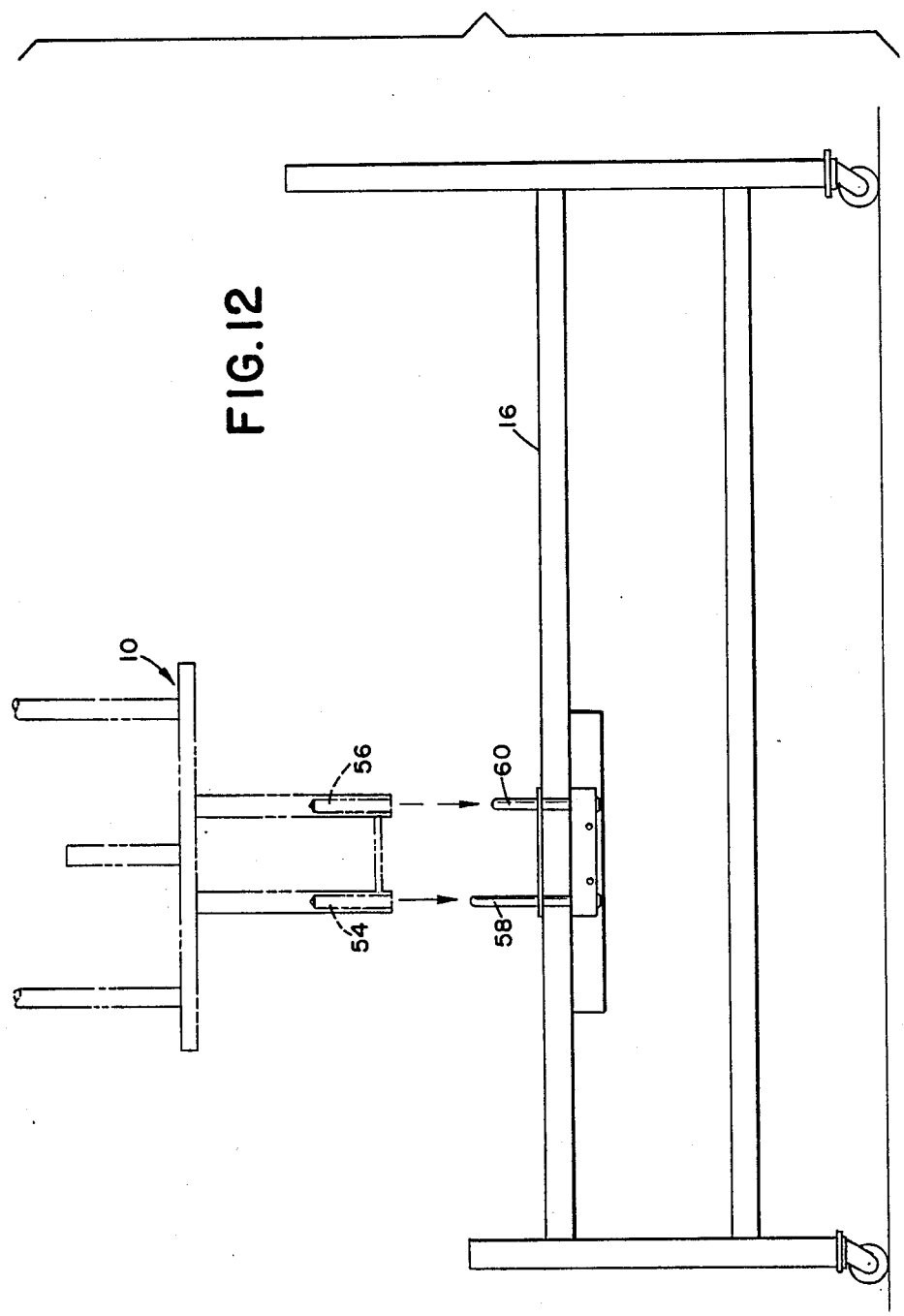

PATIENT EQUIPMENT TRANSPORT AND SUPPORT SYSTEM

This is a divisional of co-pending application Ser. No. 886,207 filed on July 15, 1986, now U.S. Pat. No. 4,795,122.

BACKGROUND OF THE INVENTION

This invention pertains to the art of transport and support systems and, more particularly, to a selectively mountable transport bracket for use with an invalid or hospital patient transport vehicle.

The invention is particularly applicable to a selectively transportable equipment support system for operative association with a hospital bed and, more particularly, to a transport system for equipment primarily to be used for patient care to and from an operating room to an intensive care unit. However, it will be appreciated by those skilled in the art that the invention could be readily adapted for use in other environments as, for example, where similar transport and support devices are employed for the convenient transport of other types of equipment.

For very ill hospital patients, such as for example cardiac surgery patients, there is a great deal of equipment associated with their treatment. Much of this equipment will comprise infusion pumps and intravenous solutions. A common problem in all hospitals is how to transport the equipment which is in operative use with the patient, along with the patient over long distances through the hospital, across elevator thresholds or around hallway corners. Frequently, several nurses are required to handle the transport of the patient and the equipment. Some nurses will be moving the bed containing the patient, other nurses would be pushing IV stands and other equipment support devices. The number of people involved, the instability of some of the equipment support systems during rolling movement and normal path obstacles such as elevator thresholds have all combined to make it troublesome and difficult for the movement of the patient and equipment when moving the patient to and from an operating room or from and to an intensive care unit or a patient holding area.

In addition, the complexity and size of some of the equipment now used for patient care demands more stable and reliable support devices to insure the safety of the equipment. As the equipment increases in size, weight, and variety, a support system has long been needed which will conveniently allow for the secure support of the equipment, its easy maneuverability for the convenience of the patient and its easy transport during times when the equipment is operatively associated with the patient and the patient needs to be moved from place to place in the hospital.

The various forms and types of equipment support and transport systems for infusion pump equipment and the like have heretofore suffered from all these problems. The present invention comprises a new and improved method and system which overcomes all of the above referred to problems and others to provide a new invalid equipment transport and support system which is simple in design, economical to manufacture, readily adaptable to a plurality of uses with patient transport vehicles having a variety of dimensional characteristics, easy to attach, easy to remove, and easy to transport to provide improved equipment support and improved convenience and safety to a hospital patient.

BRIEF SUMMARY OF THE INVENTION

In accordance with the present invention, there is provided in combination a patient transport vehicle for a hospital patient, a transport bracket for selective support of patient care equipment on the transport vehicle, a service column for alternative secured support of the transport bracket; and means for selectively mounting the transport bracket to the transport vehicle and the service column. Patient care equipment is conveniently supported near the patient on the transport bracket and is transported with the patient and his transport vehicle by the transport bracket during patient movement.

The invention comprises a selectively transportable equipment support system for operative association with any type of patient transport vehicle and which is particularly intended for use with a hospital bed. The transport bracket includes means for support of patient care items such as infusion pumps or intravenous solution bags, and further includes means for selective secured association with the hospital bed and the service column. The service column comprises a recovery room service column and a surgical room service column. Preferably, the transport bracket includes an upstanding pivot post sized for pivotable reception in a service column support arm. A latching block assembly is disposed in the pivotable support arm for latching reception of the pivot post.

In accordance with another aspect of the present invention, the service column includes means for axially telescoping the column for selective positioning of the pivotable support arm and transport bracket when mounted thereon. The axially telescoping service column, in combination with the pivotable support arm and further in combination with the pivotable mounting of the transport bracket to the support arm, allows for a variety of movement of the transport bracket for selective positioning of equipment relative to the patient and for convenient mounting of the transport bracket to the patient transport vehicle.

In accordance with the present invention, a method is provided for the support and transport of hospital patient care items. The method comprises a first step of providing a transport bracket sized for support of a plurality of hospital patient care items. The bracket includes means for selective attachment to a hospital bed and a hospital service column. The second step of the method comprises attaching the transport bracket to a hospital bed whereby the patient care items can be transported with the bed and the patient. The third step comprises attaching the transport bracket to the service column at a place of patient care and unattaching the transport bracket from the bed whereby the patient care items can be supported near the patient by the service column when the bed is removed.

One benefit obtained by the use of the present invention is an invalid care and equipment transport system which provides improved stability and safety for equipment needed to be transported with a patient.

Another benefit obtained from the present invention is the provision of a equipment transport bracket which can be selectively mounted to a patient transport vehicle and a hospital service column. When mounted to the transport vehicle, the transport bracket supports the equipment by attachment to the transport vehicle and avoids the necessity for separate, independently moved equipment support devices.

A further benefit of the present invention is a transport and support system which provides for convenient powered detachment of the transport bracket from the transport vehicle by a service column and mounting of the transport vehicle on the service column at a position allowing convenient operative association of the equipment with the patient at a position spaced from the transport vehicle.

Another benefit of the present invention is that it meets the overall transport requirements for cardiac patients moving from surgery to an intensive care unit or from an intensive care unit to surgery. It simplifies the use of infusion pumps in both areas and provides for some standardization in the infusion management philosophies of both areas.

Other benefits and advantages for the subject new invalid equipment transport system will become apparent to those skilled in the art upon a reading and understanding of this specification.

BRIEF DESCRIPTION OF THE DRAWINGS

The invention may take physical form in certain parts and arrangements of parts, and certain steps and arrangements of steps, the preferred embodiments of which will be described in detail in this specification and illustrated in the accompanying drawings which form a part hereof and wherein:

FIG. 4 is a side plan view of a recovery room service column shown partially in cross-section;

FIG. 4a is a back plan view of a portion of the service column of FIG. 4 taken along lines 4a—4a of FIG. 4;

FIG. 5 is a cross-sectional view of the service column of FIG. 4 taken along lines 5—5;

FIG. 9 is a front plan view of a bed bracket formed in accordance with the present invention wherein the bracket is illustrated as attached to a transport vehicle in phantom;

FIG. 10 is a side plan view of the bed bracket of FIG. 9;

FIG. 11 is a bottom plan view of the bracket of FIG. 9;

FIG. 12 is a side plan view of the bracket of FIG. 9 particularly illustrating the bracket mounted on a bed and positioned for receptive mounting of a transport bracket wherein the transport bracket is shown in phantom;

DETAILED DESCRIPTION OF THE INVENTION

Figure 1:
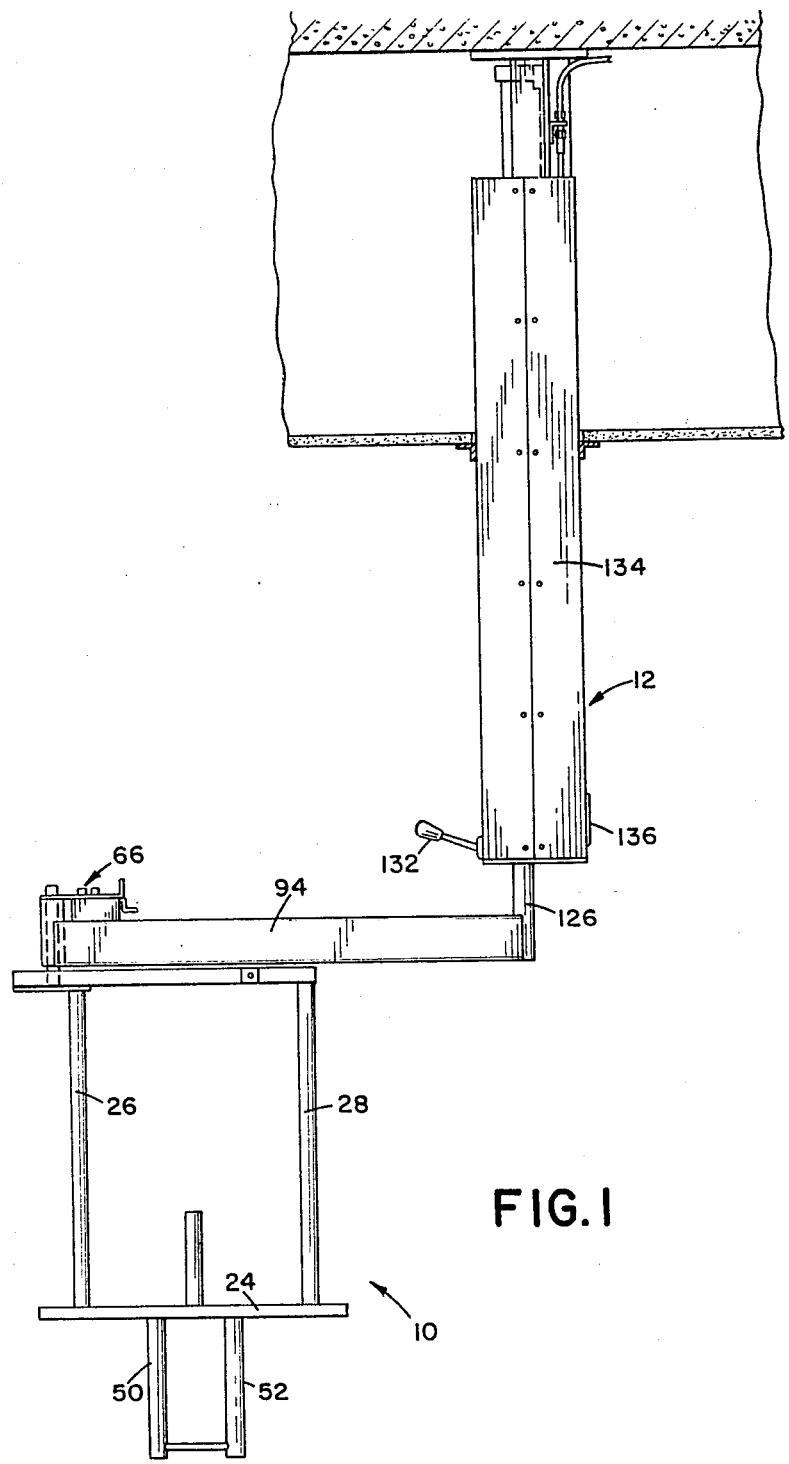
FIG. 1 is a front plan view of an unloaded transport bracket mounted to a recovery room service column formed in accordance with the present invention.

Referring now to the drawings wherein the showings are for purposes of illustrating the preferred embodiments of the invention only and not for purposes of limiting same, the FIGURES show a selectively transportable support system for patient care equipment such as infusion pumps, IV bags, and the like which are typically transported with very ill patients during hospital movement. Such movement typically occurs from a surgical room to a recovery room.

Figure 13:
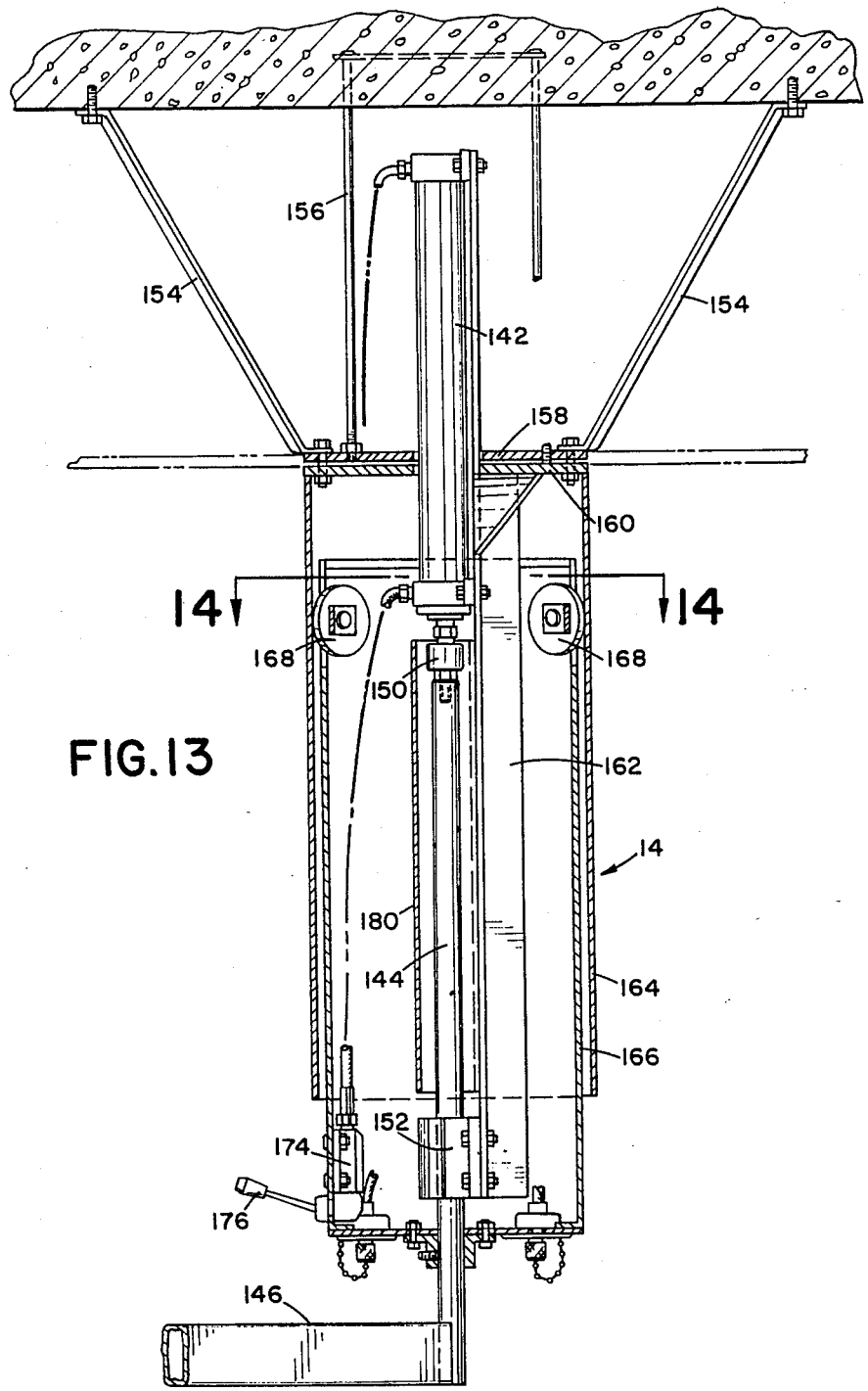
FIG. 13 is a cross-sectional view of a surgical room service column wherein the service column is shown mounted to a ceiling.

The system is comprised of a transport bracket 10, a recovery room service column 12 (FIG. 1) and a surgical room service column 14 (FIG. 13). The transport bracket 10 can be loaded with patient care equipment such as infusion pumps (FIG. 8) which needs to be transported with a patient on a patient transport vehicle 16 such as a hospital bed (FIG. 12).

Figure 2:
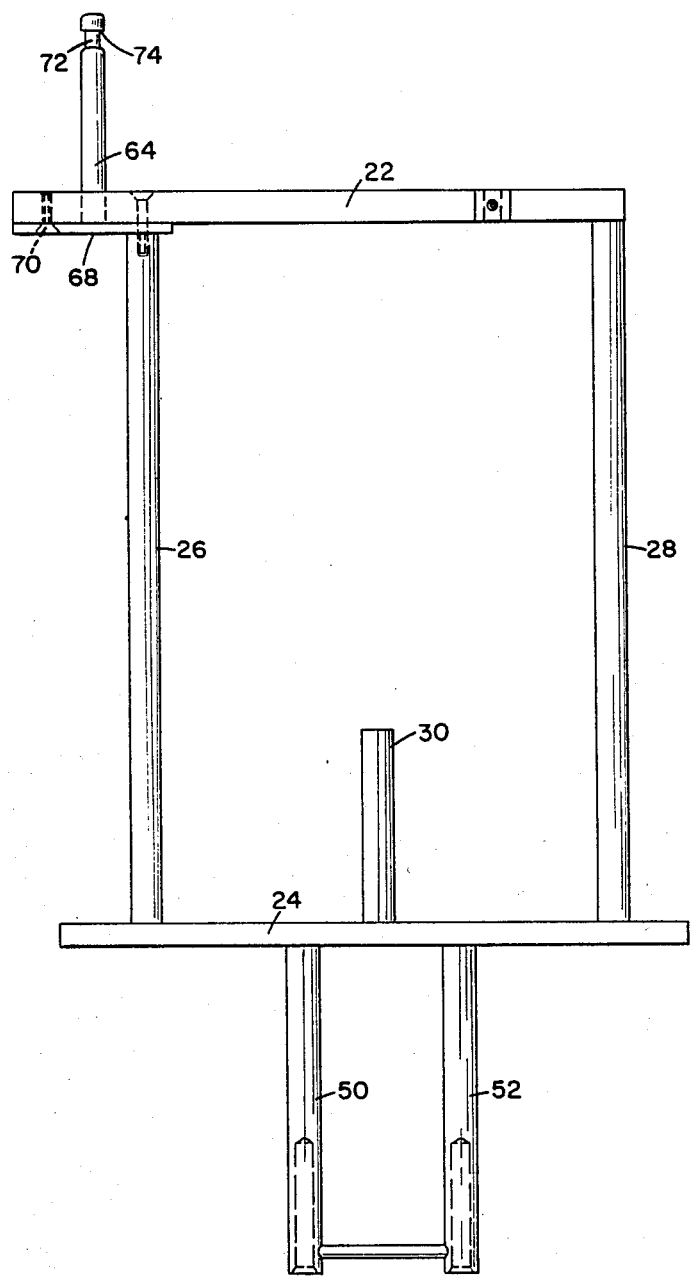
FIG. 2 is an enlarged front plan view of the transport bracket of the present invention shown partially in section by phantom lines.
Figure 3:
FIG. 3 is a side plan view of the transport bracket of FIG. 2.
Figure 8:
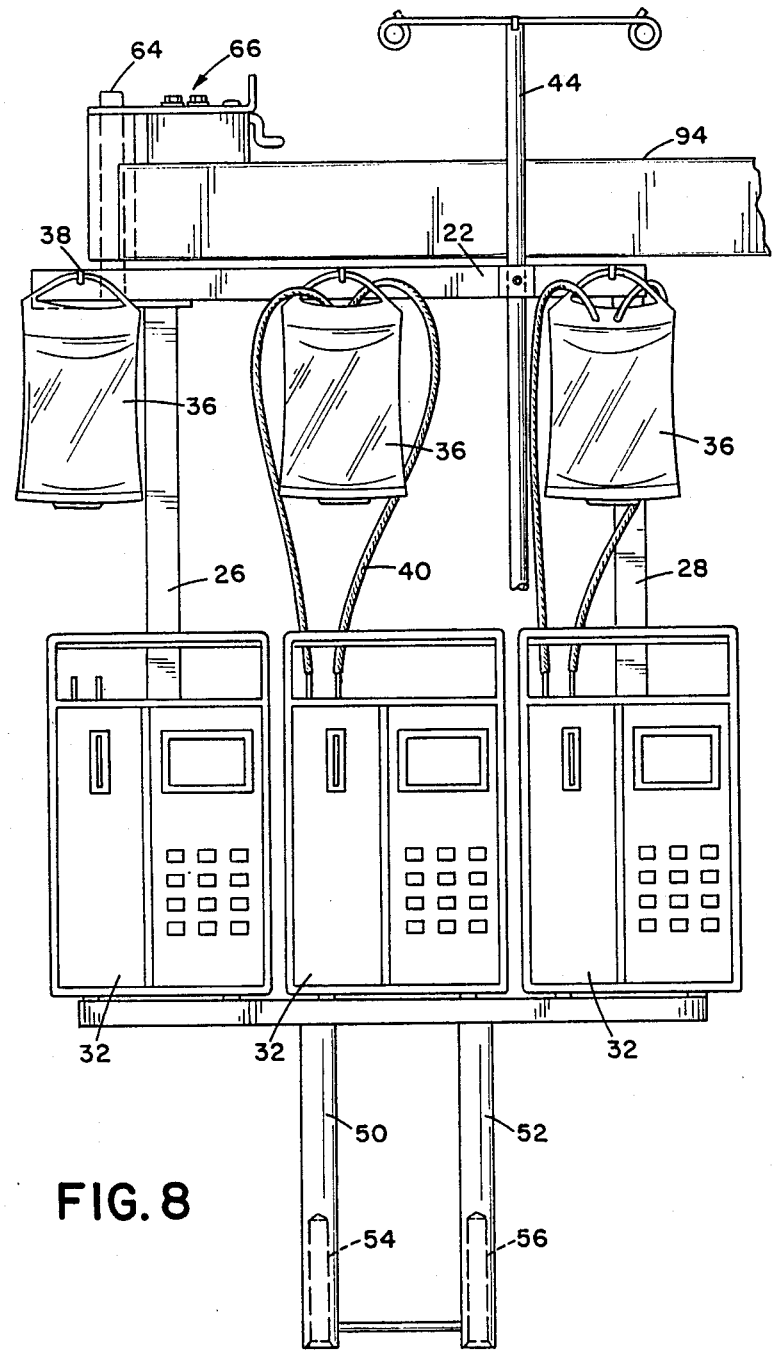
FIG. 8 is a front plan view of a transport bracket, loaded with infusion pumps and IV bags wherein the bracket is mounted on a support arm of a service column and wherein bed bracket mounting posts receptacles are shown in phantom.

More specifically, and with reference to FIGS. 1, 2, and 3, the transport bracket 10 includes means for support of patient care items and means for selective secured association with the hospital bed. The support means comprises upper rail 22, lower shelf 24, side supports 26, 28, and a central support 30. The lower shelf 24 is sized to present a platform support for different infusion pumps 32 (FIG. 8). The supports 26, 28, 30, also support the pumps 32 where the pumps are clamped to the supports (not shown). Fluid bags 36 are hung on the upper rail 22 with fasteners or hooks 28, and the fluid from the bags 36 is communicated to the pumps 32 by tubing 40. Ultimately, the fluid in the bags 36 is pumped into the patient through the infusion pumps 32. The upper rail also includes a clamp 42 for the support of an IV pole 44 upon which additional IV fluid bags may be hung.

The structure of the transport bracket 10 has been discussed with reference to the particular construction preferable for the support of infusion pumps and intravenous fluid bags. It is within the scope of the invention to include alternate constructions for the preferred support of other types of patient care items.

The means for selective secured association to the hospital bed comprises spaced transport bracket legs 50, 52 secured to the bracket lower shelf 24. Each of the legs 50, 52 include a receiving bore 54, 56 sized for cooperative mating engagement to bed support rods 58, 60 (FIG. 12) as will hereinafter be more fully discussed in conjunction with the method of the present invention.

The means for selective secured association of the transport bracket 10 with the service columns 12, 14 comprises an upstanding pivot post 64 sized for a locking pivotable reception in latching assembly 66 of the service columns. More particularly, the pivot post 64 is secured to the transport bracket 10 by a post mounting plate 68 to which the post is preferably attached by a weld. Threaded fasteners 70 are employed to fasten the post and mounting plate assembly to the upper rail 22 and side support 26.

Figure 7:
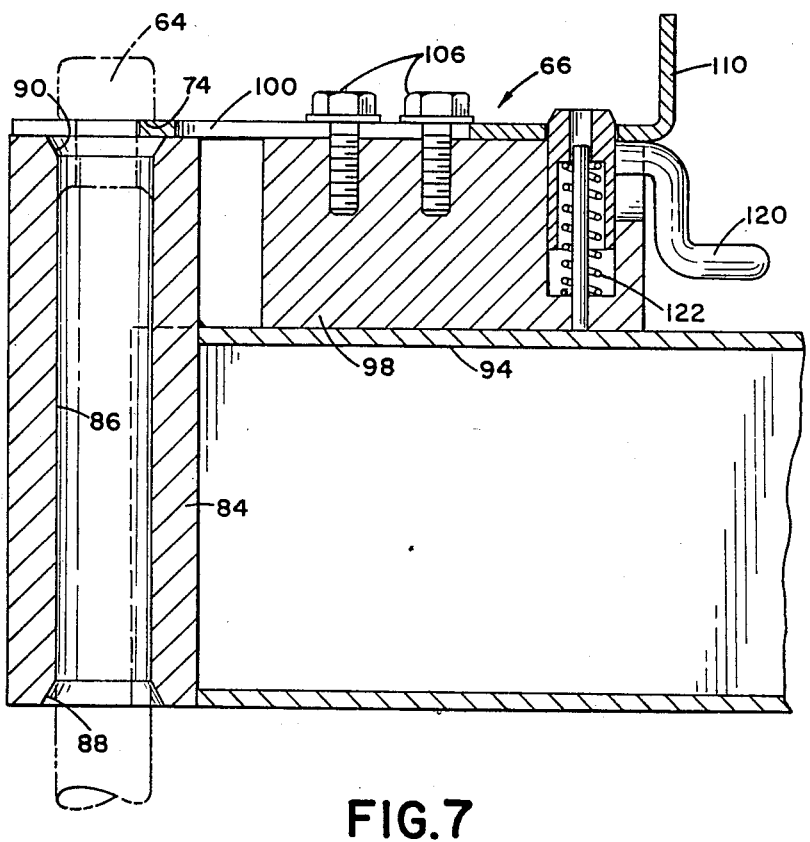
FIG. 7 is a cross-sectional view of the latching assembly taken along lines 7—7 of FIG. 6 wherein an upstanding pivot post of the transport bracket is shown in phantom and received in the latching assembly.

The post 64 includes a circumferential groove 72 comprised of a post reduced diameter portion that is sized for close reception in a latching assembly receiving bore 86 (FIG. 7). The post includes a square edge 74 at the uppermost portion of the groove 72 to facilitate locking of the latching assembly by the weight of a loaded transport bracket 10.

In operation, the transport bracket 10 will either be mounted on the hospital bed or the service column. With reference to FIG. 12, when mounted on the bed, the bed support rods 58, 60 are received in the transport leg bracket bores 54, 56. When thus mounted, the transport bracket is stationary with respect to the bed and can be moved with the bed and the patient as the patient is moved from the surgical room to a recovery room or elsewhere.

It is within the scope of the invention that the transport bracket can be mounted on any type of patient transport vehicle. With reference to FIGS. 9–11 the vehicle bed bracket 62 is comprised of two upstanding bed support rods spaced for mating reception within transport bracket legs receiving bores 54, 56 (FIG. 12). The bracket 62 further includes a transport bracket support plate 78 through which bed support rods 58, 60 extend and which is disposed for overlapping engagement against bed support member 80. A support rod block 82 further supports the rods 58, 60 and is further fastened to the bed member with threaded fasteners 85. Detailed discussion of the bed brackets 62 has been with reference to a preferred embodiment for use with a hospital bed. It is within the scope of the invention to include alternate constructions particularly adapted for other types of patient transport vehicles than a hospital bed.

Figure 6:
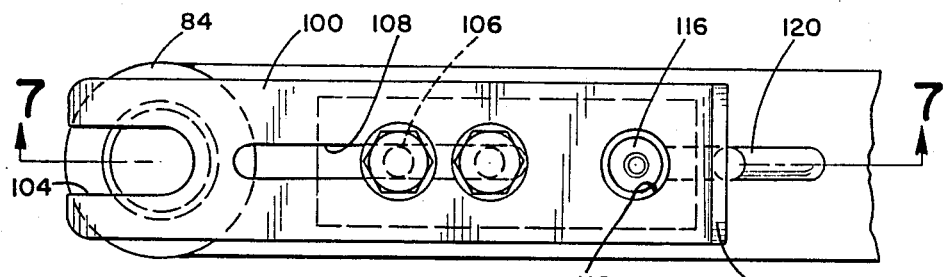
FIG. 6 is a plan view of a portion of the support arm of the service column of FIG. 4 particularly illustrating the latching assembly wherein chambers of the latching assembly are shown in phantom.

With reference to FIGS. 1, 6, and 7, the latching assembly 66 for locking the transport bracket 10 to a service column will be specifically discussed. The latching assembly 66 is intended to receive the transport bracket post 64 so that the transport bracket is secured to the service column. The post 64 is received in a tube 84 having an open ended passageway 86 sized for close reception of the post 64. The passageway 86 includes chamfered end portions 88, 90 for ease and convenience in inserting and removing the post 64 from the passageway 86. The tube 84 is secured to a receiving column arm 94 by welding 96 at the terminal ends of the arm 94 where the arm engages the tube. With particular reference to FIG. 6, it may be seen that the tube 84 is received in a generally arcuate cut-out of the terminal end portion of the arm 94 which mates with a segment of the circumference of the tube. A weld attachment along the arm terminal end 94 is effective in securing the tube to the arm and in supporting the weight of the transport bracket and any equipment contained thereon.

A latching block 98 is also secured to the arm 94 by a weld and supports a latch plate 100 and a locking pin assembly 102. The latch plate 100 has a pivot post slot 104 in a terminal end portion of the plate which is sized for close reception of the pivot post circumference groove 72 upon full reception of the post in the tube passageway 86 whereby the post 64 is secured in the latching block assembly for pivotable support of the transport bracket. When the post 64 is thus locked in the latch assembly 66, the square edge 74 presses upon the latching plate so that the latching assembly can only be released after all weight has been removed from the arm 94. More particularly, the latch plate 100 is slidingly secured to the block 98 by guides 106 and guide slot 108. Slot 108 is sized to allow sliding movement of the plate 100 away from the pivot post 64 so that the post can be removed from the passageway 86. A latch plate handle 110 facilitates operator sliding of the plate 100.

The locking pin assembly 102 comprises a spring biased pin 116 urged into a locking pin bore 118 and the plate 100. In operation, to separate the transport bracket 10 from the service column arm 94, pin handle 120 is operated to compress the pin spring 122 so that the plate can be slid away from the pivot post 64. Conversely, when the pivot post is desired to be locked in the latch assembly 66, the plate 100 is urged toward the post until the pin is overlapped by the pin bore 118 and may be locked in a pin locking position by reception in the pin bore 118.

The service columns which support the transport bracket 10 away from the hospital bed preferably comprise a recovery room service column 12 (FIG. 1) and an operating or surgical room service column 14 (FIG. 13).

With reference to FIGS. 1, 4, and 5, the recovery room service column 12 includes a selectively operable gas powered piston and cylinder assembly 124 for selective positioning of a shaft 126 secured to the support arm 94. The piston and shaft are supported by an adapted T-beam 128 fastened to the recovery room ceiling. A valve 130 operated by handle 132 allows an operator to selectively control the positioning of the arm 94 vertically through the control of gas pressure to the piston 124. A housing 134 encases the cylinder and shaft assembly and is also fastened to the T-beam 128. Bearing block 122 guides and supports the shaft 126. The lower portion of the service column 12 preferably includes a number of electrical outlets 136 to supply power to the equipment that may be mounted on the transport bracket.

In operation, the transport bracket 10 is loaded onto the support arm 94 by selective positioning of the shaft 126 to allow reception of the transport bracket pivot post 64 within the latching assembly 66. After locking of the post within the latching assembly, the piston cylinder 124 is powered to lift the latch transport bracket off of the hospital bed support bracket 62 (FIG. 12) for positioning at a location convenient to the patient. In loading the transport bracket off of the service column 12 and back on to the bed bracket 62, the transport bracket legs 50, 52 are similarly aligned with the bracket support rods 58, 60 and the cylinder is operated to lower the transport bracket 10 onto the bed bracket 62. After the weight of the transport bracket 10 is relieved from the support arm 94, the latching assembly 66 may be unlocked and the arm 94 is lifted away from the pivot post 64. In this manner, the transport bracket 10 can be selectively attached to a hospital bed whereby the patient care items can be transported with the bed and the patient; selectively attached to a service column 12 at a place of patient care whereby the patient care items can be supported off the bed and near the patient.

Figure 14:
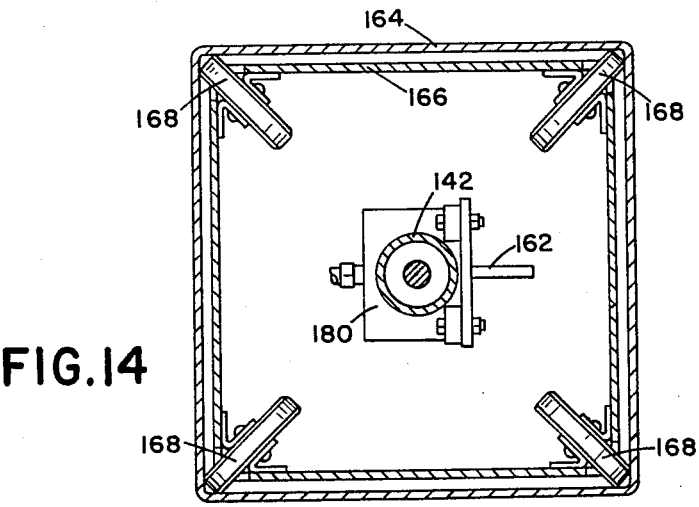
FIG. 14 is a cross-sectional view taken along lines 14—14 of FIG. 13.
Figure 15:
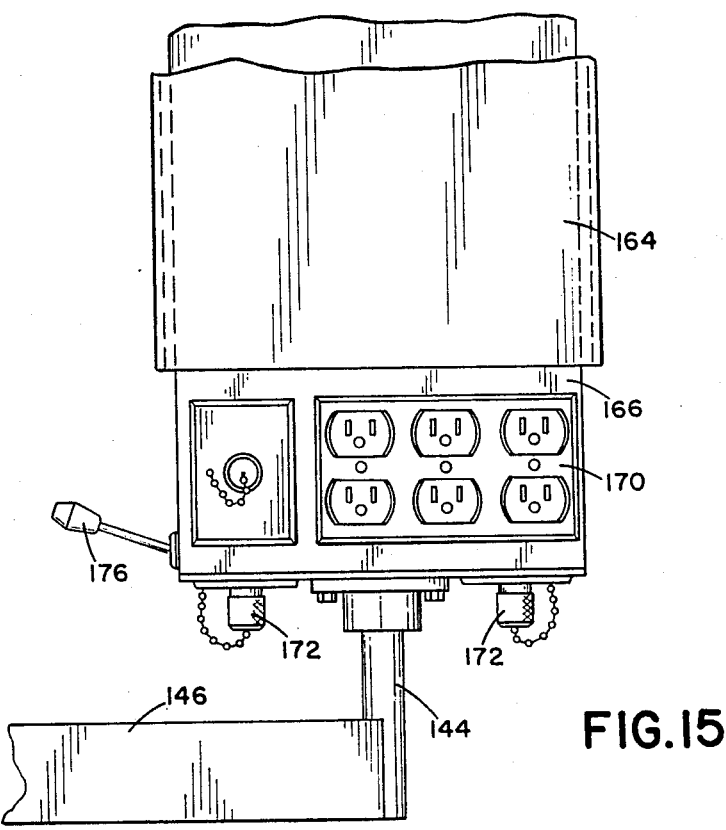
FIG. 15 is a back plan view of a portion of the service column of FIG. 13.

With reference to FIGS. 13, 14, and 15, a surgical unit service column 14 formed in accordance with the present invention is illustrated. The surgical room service column 14 is generally of a larger construction than the recover room service column 12 to accommodate additional electrical and various gas and air services. It is also selectively positionable in the vertical direction by selective operation of a pneumatically operated piston and cylinder assembly 142 and associated shaft 144 secured to support arm 146. Support arm 146 is identical in construction to the support arm 94 of the recovery room service column 12. Shaft 144 is coupled to the piston cylinder 142 with a coupler 150 and supported in bearing block 152. The assembly is secured to a surgical room ceiling by bracket supports 154, 156, the fixed mounting plate 158 and a leveling mounting plate 160. A T-beam assembly 162 fastened to the plates 158, 160 comprises the main support for the piston cylinder 142 and shaft 144. A telescoping housing comprising a housing outer member 164 and a housing inner member 166 encases the piston and shaft. Guide rollers 168 direct and space the movement of the inner housing 166 from the outer housing 164 to avoid rubbing or interference during telescopic movement.

The surgical room service column includes electrical outlets 170 and gas and air connects 172 for service or supply to the patient or support equipment. A piston control valve 174 operated by handle 176 directs the operation of the piston cylinder 142 in a manner similar to the operation of the recovery room service column. Since the valve gas connects and electrical outlets require a number of service lines contained within the column 14, a cover shield 180 protects the lines from being crimped or caught by the shaft 144 during operation.

OPERATION

The subject development has been intended to work as an integral part of the transport mechanisms and infusion management of hospital patients and, in particular, cardiac surgery and cardiovascular intensive care unit patients. The selectively transportable equipment support system is constructed to lift up to 175 lbs. of equipment and is powered by a conventional hospital air supply line. Electrical power sources are also provided in the service column supports for convenient power supplies for the infusion pumps which are typically transported with cardiac patients and employed in the cardiovascular intensive care units. The subject support and transport system includes a linear bearing assembly in the service columns to provide virtually frictionless rotational and vertical movement of the support arm. The control valves are spring loaded to a center or "off" position to minimize operational failures. The lift pistons also drive the support arms down for lowering the transport brackets onto the patient beds. For safety reasons, the drive power in the lowering mode is preferably limited to 25 lbs. plus the variable weight of the transport bracket and equipment (typical expected weight 100 lbs).

The latching assembly of the support arm provides a positive coupling between the transport bracket and the service columns. The latching mechanism can only be released after all weight has been removed from the support arm. Virtually, any type of bracket construction can be employed with the service column as long as an appropriate pivot post coupling is employed and so long as the bracket does not exceed weight limitations.

During normal operation of the system, a patient returning from surgery will arrive in the cardiovascular intensive care unit with a transport bracket 10 mounted on the side of the bed 16. The bracket will include all infusion pumps 32 and intravenous solutions 36 used during the surgical case. After the patient has been stabilized, the nurse will lower the service column arm 94 and couple the transport bracket 10 to the arm. This is accomplished by simply lowering the arm 94 onto the pivot post pin 64 of the transport bracket 10, locking the assembly and raising the bracket 10 off the bed 16. The transport bracket will then be rotated away from the bed for use as an intravenous solution distribution bracket. If the patient needs to be returned to surgery, the bracket 10 can be moved back onto the bed 16 and transported with the patient to surgery.

A principal advantage of employing the subject system is that it meets the overall transport requirements for cardiac patients moving from surgery to the intensive care units or from the intensive care units to surgery. It simplifies the use of infusion pumps in both areas. The system will replace at least two floor intravenous stands at each location. It also provides for standardization in the infusion management philosophies of both surgical areas and intensive care unit areas.

The invention has been described with reference to the preferred embodiments. Obviously, modifications and alterations will occur to others upon the reading and understanding of the specification. It is my intention to include all such modifications and alterations insofar as they come within the scope of the apended claims or the equivalents thereof.

Having thus described my invention, I now claim:

1. A hospital service column for association with an equipment transport bracket including a bracket post including:
   a pivotable support arm having a latching block assembly disposed for locking reception of the transport bracket, the block assembly including a post receiving tube adapted to receive the bracket post for pivotable reception of the bracket and having a latch plate and locking pin assembly;
   a piston and cylinder assembly in association with said support arm for selective powered positioning of the support arm, said support arm being mounted to a shaft coupled to said piston and cylinder assembly;
   selectively operable valve means for operation of said piston and cylinder assembly; and,
   a housing sized to contain said piston and cylinder assembly and including service outlet means for the communication of power and gas sources.

* * * * *